United States Patent
Sakpal et al.

(10) Patent No.: US 8,752,757 B2
(45) Date of Patent: Jun. 17, 2014

(54) DEVICE PAIRING USING DIGITAL BARCODING

(75) Inventors: Ajay Laxman Sakpal, Bangalore (IN); Ravi Kiran Samavedula, Bangalore (IN); Mallikarjun Pootipedi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/561,232

(22) Filed: Jul. 30, 2012

(65) Prior Publication Data

US 2013/0334298 A1 Dec. 19, 2013

(30) Foreign Application Priority Data

Jun. 14, 2012 (IN) .......................... 2376/CHE/2012

(51) Int. Cl.
*G06F 17/00* (2006.01)

(52) U.S. Cl.
USPC ...................................... 235/375; 235/472.01

(58) Field of Classification Search
USPC ............... 235/471, 462.42, 494, 375, 462.01, 235/472.01; 340/870.07; 345/589, 440; 715/841; 705/26; 709/203; 178/19.01; 607/60

See application file for complete search history.

(56) References Cited

U.S. PATENT DOCUMENTS

| | | | |
|---|---|---|---|
| 7,278,579 B2 * | 10/2007 | Loffredo et al. | 235/462.46 |
| 2008/0113618 A1 | 5/2008 | De Leon et al. | |
| 2011/0072263 A1 | 3/2011 | Bishop et al. | |
| 2011/0131061 A1 * | 6/2011 | Shain | 705/3 |
| 2013/0056535 A1 * | 3/2013 | Rowlandson et al. | 235/380 |
| 2013/0087609 A1 * | 4/2013 | Nichol et al. | 235/375 |

* cited by examiner

*Primary Examiner* — Ahshik Kim
(74) *Attorney, Agent, or Firm* — Hanley, Flight and Zimmerman, LLC

(57) ABSTRACT

Systems, apparatus, and methods are disclosed to pair devices via digital barcode. An example device is arranged to capture an image of a digital barcode. The example device is arranged to decode the digital barcode to determine a device identifier for each of one or more monitoring devices represented by the digital barcode, each of the one or more monitoring devices associated with a patient. The example device is arranged to request data from each of the one or more monitoring devices based on the one or more device identifiers. The example device is arranged to display the requested data.

17 Claims, 4 Drawing Sheets

1. Bedside Monitor (connected)
2. Bedside Monitor (connected)
3. Bedside Monitor (disconnected)
4. Bedside Monitor (disconnected)
5. Patient Bed
6. Digital Barcode 1. Data is streamed from the server to bed-side devices.
2. Barcode is generated based on the connected devices.
3. Mobile device captures the barcode, retrieves the device id of the connected devices.
4. Mobile device requests the server for data from devices obtained in 3.
5. Server provides the data which is displayed in the mobile device.

DEVICE PAIRING USING DIGITAL BARCODING

CROSS-REFERENCE TO RELATED APPLICATIONS

This patent claims the benefit of priority to Indian Patent Application 2376/CHE/2012, filed on Jun. 14, 2012, which is herein incorporated by reference in its entirety.

FIELD OF THE DISCLOSURE

This disclosure relates generally to device pairing, and, more particularly, to device grouping and pairing via scanning of a digital barcode.

BACKGROUND

Information helps provide a more comprehensive patient record and facilitate improved patient diagnosis and treatment. Electronic systems provide electronic medical records, but physicians are often left without appropriate tools for information capture and documentation.

When a patient is admitted to a hospital, for example, he or she may be connected to more than one device. It may be difficult and time consuming to retrieve information from those devices.

BRIEF SUMMARY

Certain examples provide methods, systems, and apparatus to pair devices via digital barcode.

Certain examples provide a method including determining, using a processor, one or more monitoring devices associated with a patient. The example method includes generating, using the processor, a digital barcode based on the one or more monitoring devices associated with the patient. The example method includes providing, in response to a request, the digital barcode to a mobile device. The example method includes facilitating, using the processor, retrieval of information from the one or more monitoring devices to the mobile device based on the digital barcode.

Certain examples provide a tangible computer readable storage medium including instructions for execution by a processor, the instructions when executed implementing a method to pair devices based on a digital barcode. The example method includes determining one or more monitoring devices associated with a patient. The example method includes generating a digital barcode based on the one or more monitoring devices associated with the patient. The example method includes providing, in response to a request, the digital barcode to a mobile device. The example method includes facilitating retrieval of information from the one or more monitoring devices to the mobile device based on the digital barcode.

Certain examples provide a device including a processor and a memory arranged to store instructions and data. The example device is arranged to capture an image of a digital barcode. The example device is arranged to decode the digital barcode to determine a device identifier for each of one or more monitoring devices represented by the digital barcode, each of the one or more monitoring devices associated with a patient. The example device is arranged to request data from each of the one or more monitoring devices based on the one or more device identifiers. The example device is arranged to display the requested data.

Figure 1:
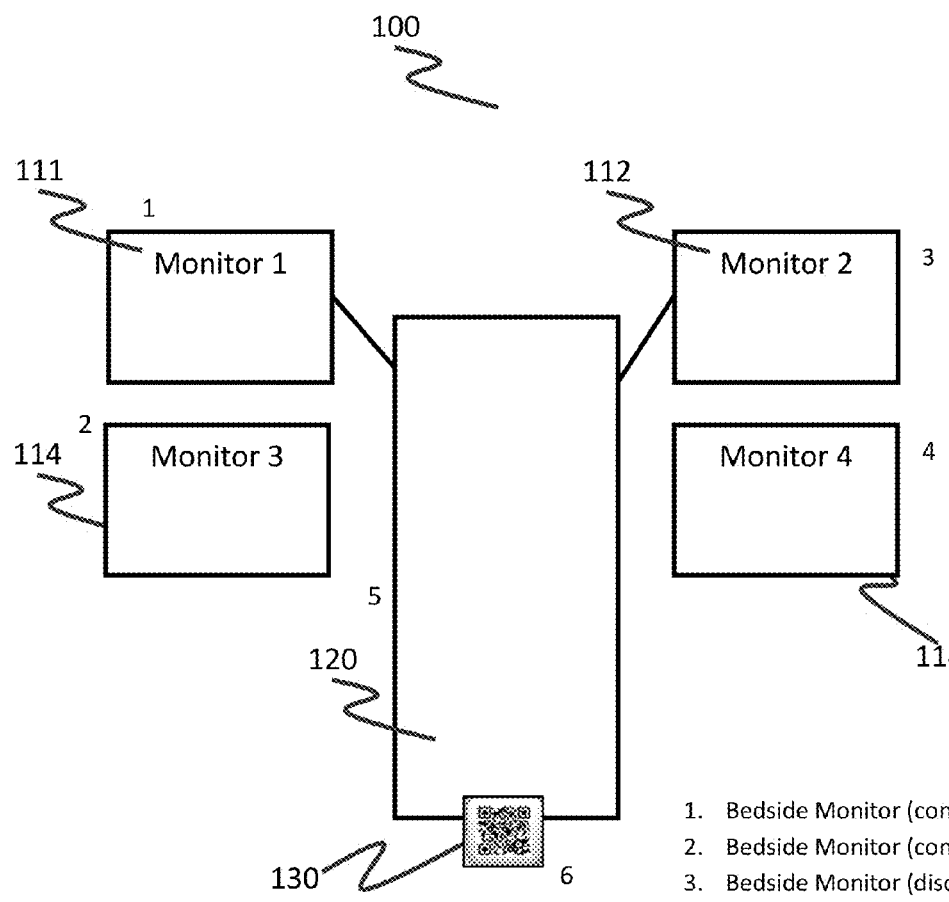
FIG. 1 illustrates an example system including a group of patient monitoring devices arranged with respect to a patient bed.

The following detailed description of certain implementations of the methods, apparatus, systems, and/or articles of manufacture described herein, will be better understood when read in conjunction with the appended drawings. It should be understood, however, that the methods, apparatus, systems, and/or articles of manufacture described herein are not limited to the arrangements and instrumentality shown in the attached drawings.

DETAILED DESCRIPTION

When a patient is admitted to a healthcare facility, such as a hospital, clinic, etc., the patient may be connected to more than one device for monitoring, administration, etc. Each of these connected devices may have a separate monitor to show the patient vitals. In certain examples, depending on the devices that are connected to the patient, a digital barcode or other scannable indicate is generated and rendered to a display (e.g., a screen attached to a patient bed). A visiting physician can scan the digital barcode using a mobile device, and the information shown on the bedside monitor(s) streams to the mobile device, for example.

Depending on the number of devices that are connected to the patient a unique quick response (QR) code (e.g., barcode) can be generated. The QR code includes the device identifiers (IDs) of the connected devices. That is, a code, such as a composite code, is generated based on a number of connected devices and an identifier associated with each device to form a resulting QR code indicative of the number of devices, type of each device, etc., in the particular connected device configuration. By scanning or otherwise reading the code, a device, such as a mobile device (e.g., smartphone, tablet computer, laptop, etc.) can access information from and/or otherwise connect to each of the connected devices, for example. The QR code changes whenever an additional device is connected or an existing device is disconnected, for example.

For example, a physician visiting a patient and bringing a tablet computer including a camera can take a picture or video of a barcode displayed on a bedside monitor for the patient. A program running on the tablet decodes the barcode to retrieve the device IDs of the devices connected to the patient. Using the device IDs of the connected devices, the program in the tablet can stream the data and show the content that is visible on the bedside monitor(s).

For example, vitals that are measured for a patient are spread across various monitors, and the visiting physician typically has to spend time looking across various screens for getting all the required information. Using the composite barcode and tablet reader, the physician need not go to each bedside monitor to look at the vitals. All of the information is made available on the mobile screen, and the physician can spend more time with the patient.

Certain examples can help shorten the total time spent by a physician with the patient. A physician can spend quality time with the patient sitting shoulder to shoulder rather than spending time looking at the monitors connected to the patient individually. As the cycle time for each patient is reduced, the physician is able to visit more patients.

In certain examples, rather than or in addition to using a digital barcode (QR code), other forms of data transfer such as Near Field Communication (NFC) can be used. A variety of techniques can be used to pair multiple devices to one device (N to 1), for example, for review, control, etc.

Certain examples group devices via barcode to share data as a consolidated unit or group. In certain examples, given a plurality of devices, some devices may be connected while others are not connected.

FIG. 1 illustrates an example system 100 including a group of patient monitoring devices 111-114 arranged with respect to a patient bed 120. As shown in the example, two of the devices 111-112 are connected, and two to of the devices 113-114 are disconnected. The two connected devices 111-112 can form, in connection with the patient bed 120, a digital barcode 130 to indicate a number, type, and combination of connected devices 111-112 with respect to the patient bed 120. By scanning the generated barcode 130, a device can connect with and/or access data from the connected devices 111-112, for example.

Figure 2:
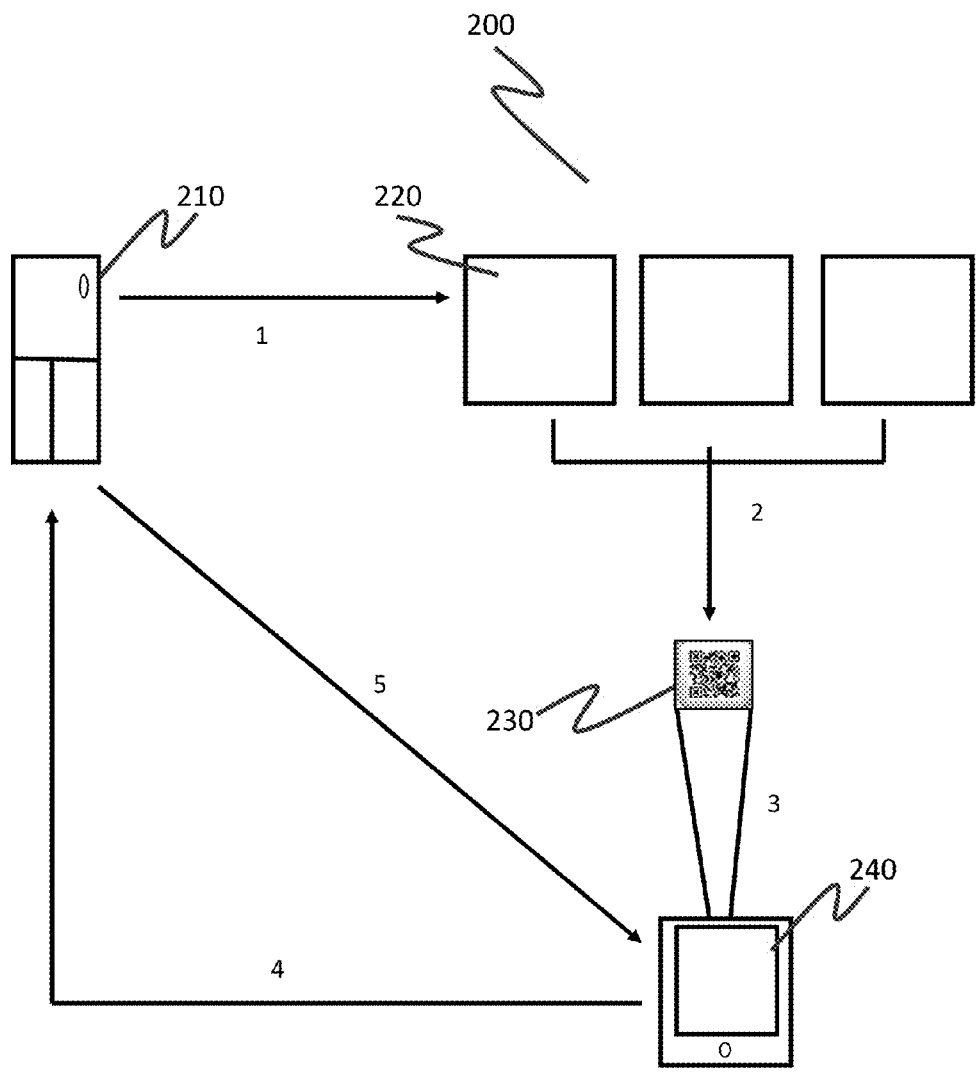
FIG. 2 illustrates an example system and associated data flow including a group of patient monitoring devices accessible via a mobile device.

FIG. 2 illustrates an example system 200 and associated data flow including a plurality of bed-side and/or other patient monitoring devices 220. As shown at 1 in FIG. 2, data is streamed from a server 210 to the plurality of connected devices 220.

At 2, a barcode 230 is generated based on the connected devices 220. For example, a digital barcode, QR code, and/or other representation 230 can be generated based on a composite of individual signatures associated with each of the plurality of connected devices 220, a random or pseudorandom barcode representing the plurality of connected devices 220, a look-up barcode retrieved from memory that has been previously associated with the group of connected devices 220, etc. The barcode 230 can include and/or represent a number of connected devices 220, a type of connected devices 220, a grouping or configuration of the devices 220, etc. In certain examples, the barcode 230 identifies the entire group of devices 220. In certain other examples, the barcode 230 identifies one of the group of connected devices 220 which can in turn identify others in the group of connected devices 220 when queried. In certain examples, the barcode 230 can be mapped to data at the server 210 which stores a number, type, arrangement, etc., for the group of connected devices, rather than the barcode 230 itself conveying such information.

At 3, a mobile device 240 captures the barcode 230 and retrieves a device identifier for each connected device 220 based on the barcode 230. At 4, using the device identifier(s), the mobile device 240 requests data from the server 210 for each of devices 220 for which it received an identifier or indication of identification, for example. At 5, the server 210 provides the data for display via the mobile device 240.

In certain examples, the mobile device 240 can view, modify, update and/or otherwise provide feedback regarding the displayed data and/or functionality. The mobile device 240 can communicate with the device(s) 220 directly, can communicate with the server 210 to rely to the device(s) 220, etc. In certain examples, the mobile device 240 can be linked with the group of connected devices 220 and interface with and/or otherwise control one of more of the group of devices 220 after linking to the devices 220 via the barcode 230.

Figure 3:
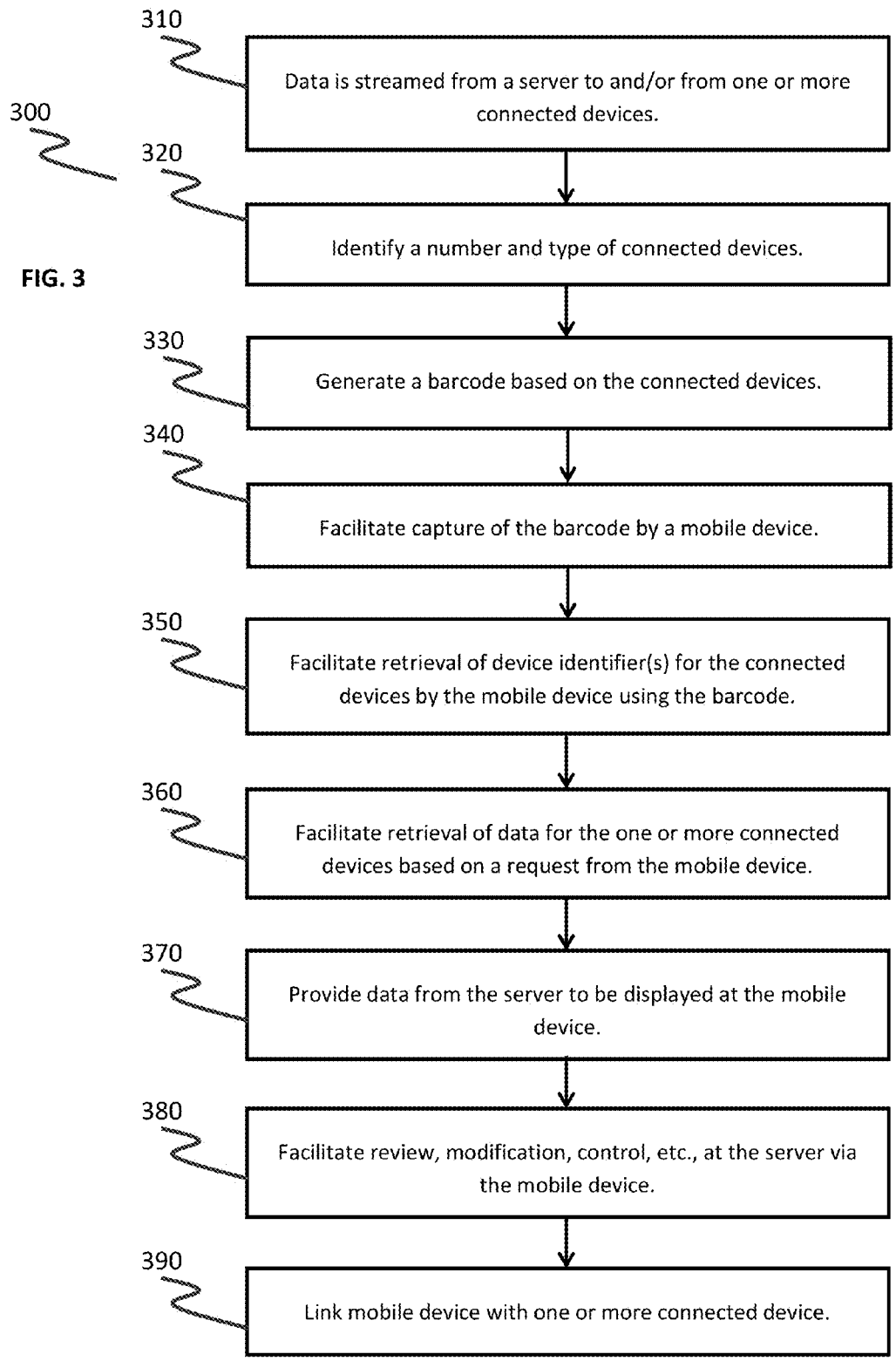
FIG. 3 illustrates a flow diagram for an example method to combine data from a plurality of devices.

FIG. 3 illustrates a flow diagram for an example method 300 to combine data from a plurality of devices. At block 310, data is streamed from a server to and/or from a plurality of bed-side devices. For example, data is provided to and/or from a vitals monitor, a drug delivery pump, an electronic medical record, etc., organized with respect to a patient bed. At block 320, a number and type of the plurality of bed-side devices is identified. At block 330, a barcode is generated based on the connected devices. As disclosed above, for example, the barcode and/or other digital identifier can be based on a composite and/or other combination of device identifiers, can be associated with a combination of devices/device identifiers, etc. In certain examples, the barcode encodes a number of connected devices, type(s) of connected devices, grouping information, etc. The barcode can be generated dynamically (e.g., on the fly), via look up, through a composite of individual device codes, etc.

At block 340, a mobile device captures the barcode. For example, an infrared scanner, camera, near field communication device, Bluetooth™ wireless interface, etc., captures and/or otherwise recognizes the barcode. At block 350, the mobile device retrieves the device identifier of the group of connected devices, the device identifier of each connected device, etc. The mobile device then knows how many devices are connected, what type(s) of devices are connected in the group, etc., for example.

At block 360, the mobile device requests data from the server for each device identified in block 350. The mobile device asks the server to provide information for the group of connected devices, for example. In certain examples, the mobile device can query and/or interact with the connected device(s) themselves.

At block 370, the server provides the data to be displayed at the mobile device. The server knows which devices, their composition, grouping, etc., and provides data to the mobile device. At block 380, the mobile device can view, modify, update/provide feedback, control, etc., at the server, which can then propagate to/update the connected devices, for example.

At block 390, the mobile device can now be linked with the group and interface with and/or otherwise control one or more of the connected devices after link/synch with the barcode.

Certain examples may be implemented and/or used in conjunction with an information system for hardware enterprise. For example, a business and application information system may include one or more clinical applications, a processor, data storage, etc. The application may be a clinical application such as a perinatal, radiology, cardiology, and/or other application. Certain examples may provide an architecture and framework for a variety of clinical applications, for example.

An example clinical information system may include a clinical application such as, for example, an advantage workstation ("AW") and/or Centricity™ product, both manufactured by GENERAL ELECTRIC®. The example clinical information system may also include a radiology information system ("RIS"), a picture archiving and communication system ("PACS"), an electronic medical record ("EMR"), a laboratory information system ("LIS"), a monitoring and/or other perinatal application, an interface, a data store, and one or more workstations, for example. In some embodiments, one or more of the example systems may be implemented remotely via a thin client and/or downloadable software solution. Furthermore, one or more components of the example clinical system may be combined and/or implemented together. Image information, vital sign information, patient history, laboratory test results, etc., can be entered into and processed by one or more of the clinical systems, for example.

Example interface connections may be implemented by, for example, a Wide Area Network ("WAN") such as a private network or the Internet, a Local Area Network ("LAN"), etc. Accordingly, an example interface may include one or more communication components such as, for example, an Ethernet device, an asynchronous transfer mode ("ATM") device, an 802.11 device, a DSL modem, a cable modem, a cellular modem, a radio frequency identification ("RFID") device, a Bluetooth™ communication device, a near field communication ("NFC") device, etc.

While examples of implementing the methods and systems described herein has been illustrated in FIGS. 1-3, one or more of the elements, processes and/or devices illustrated in FIGS. 1-3 may be combined, divided, re-arranged, omitted, eliminated and/or implemented in any other way. Further, the example methods and systems described herein of FIGS. 1-3 may be implemented by hardware, software, firmware and/or any combination of hardware, software and/or firmware. Thus, for example, any of the examples could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the method or system claims of this patent are read to cover a purely software and/or firmware implementation, at least one of the example elements are hereby expressly defined to include a tangible computer readable medium such as a memory, DVD, CD, Blu-ray, etc. storing the software and/or firmware. Further still, the example methods and systems of FIGS. 1-3 may include one or more elements, processes and/or devices in addition to, or instead of, those illustrated in FIGS. 1-3, and/or may include more than one of any or all of the illustrated elements, processes and devices.

A flowchart representative of example machine readable instructions for implementing the methods and system described herein is shown in FIG. 3. In this example, the machine readable instructions comprise a program for execution by a processor such as the processor 412 shown in the example computer 400 discussed below in connection with FIG. 4. The program may be embodied in software stored on a tangible computer readable medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example methods and systems may alternatively be used. For example, the order of execution of the blocks may be changed, and/or some of the blocks described may be changed, eliminated, or combined.

As mentioned above, the example processes of FIG. 3 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 3 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 4:
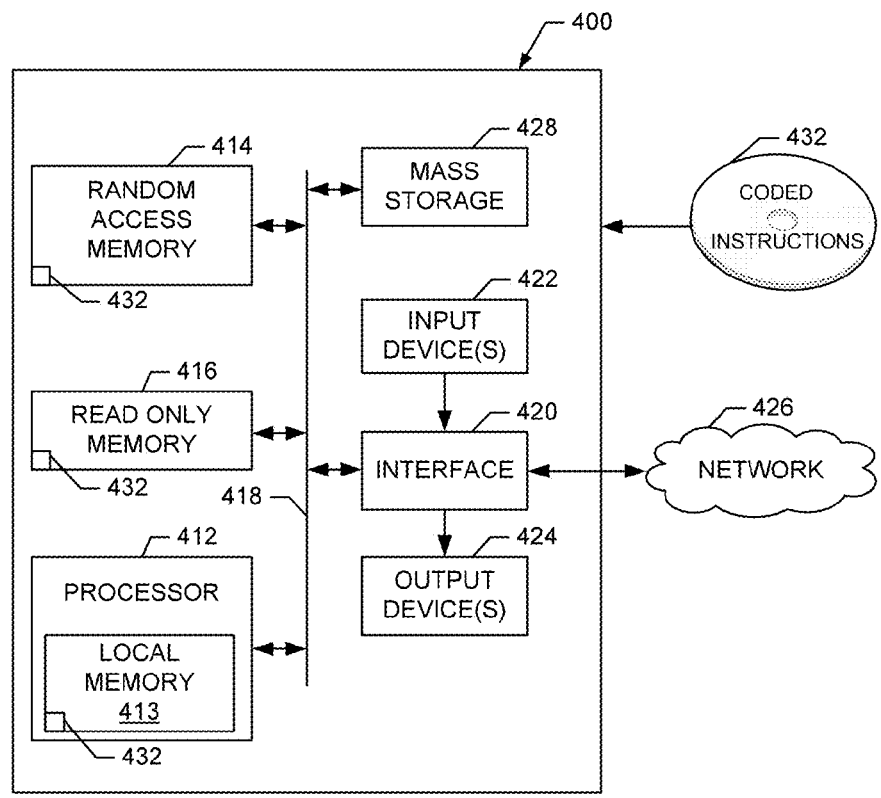
FIG. 4 is a block diagram of an example processor system which may be used to implement systems, apparatus, and methods described herein.

FIG. 4 is a block diagram of an example computer 400 capable of executing the instructions of FIG. 3 to implement the methods and system described herein. The computer 400 may be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 400 of the instant example includes a processor 412. For example, the processor 412 may be implemented by one or more microprocessors or controllers from any desired family or manufacturer.

The processor 412 includes a local memory 413 (e.g., a cache) and is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The computer 400 also includes an interface circuit 420. The interface circuit 420 may be implemented by any type of interface standard, such as an Ethernet interface, a universal serial bus (USB), and/or a PCI express interface.

One or more input devices 422 are connected to the interface circuit 420. The input device(s) 422 permit a user to enter data and commands into the processor 412. The input device(s) may be implemented by, for example, a keyboard, a mouse, a touchscreen, a track-pad, a trackball, isopoint and/or a voice recognition system.

One or more output devices 424 are also connected to the interface circuit 420. The output devices 424 may be implemented, for example, by display devices (e.g., a liquid crystal display, a cathode ray tube display (CRT), a printer and/or speakers). The interface circuit 420, thus, typically includes a graphics driver card.

The interface circuit 420 also includes a communication device such as a modem or network interface card to facilitate exchange of data with external computers via a network 426 (e.g., an Ethernet connection, a digital subscriber line (DSL), a telephone line, coaxial cable, a cellular telephone system, etc.).

The computer 400 also includes one or more mass storage devices 428 for storing software and data. Examples of such mass storage devices 428 include floppy disk drives, hard drive disks, compact disk drives and digital versatile disk (DVD) drives. The mass storage device 428 may implement a local storage device.

The coded instructions 432 of FIG. 3 may be stored in the mass storage device 428, in the volatile memory 414, in the non-volatile memory 416, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   determining, using a processor, one or more monitoring devices associated with a patient;
   generating, using the processor, a digital barcode based on the one or more monitoring devices associated with the patient, wherein the digital barcode is a composite barcode indicating a number and a type of connected monitoring devices;
   providing, in response to a request, the digital barcode to a mobile device; and
   facilitating, using the processor, retrieval of information from the one or more monitoring devices to the mobile device based on the digital barcode.

2. The method of claim 1, wherein the one or more monitoring devices is associated with a patient bed.

3. The method of claim 1, wherein at least one of the providing the digital barcode and facilitating retrieval of information further comprises using a server.

4. The method of claim 3, wherein the digital barcode is associated with data at the server from the one or more monitoring devices to be retrieved and provided to the mobile device.

5. The method of claim 1, further comprising facilitating connection with the one or more monitoring devices by the mobile device based on the digital barcode.

6. The method of claim 1, further comprising changing the digital barcode as one or more devices are at least one of added and removed from the group of one or more monitoring devices.

7. A tangible computer readable storage medium including instructions for execution by a processor, the instructions when executed implementing a method to pair devices based on a digital barcode, the method comprising:
   determining one or more monitoring devices associated with a patient;
   generating a digital barcode based on the one or more monitoring devices associated with the patient, wherein the digital barcode is a composite barcode indicating a number and a type of connected monitoring devices;
   providing, in response to a request, the digital barcode to a mobile device; and
   facilitating retrieval of information from the one or more monitoring devices to the mobile device based on the digital barcode.

8. The computer readable storage medium of claim 7, wherein the one or more monitoring devices is associated with a patient bed.

9. The computer readable storage medium of claim 7, wherein at least one of the providing the digital barcode and facilitating retrieval of information further comprises using a server.

10. The computer readable storage medium of claim 9, wherein the digital barcode is associated with data at the server from the one or more monitoring devices to be retrieved and provided to the mobile device.

11. The computer readable storage medium of claim 7, wherein the method further comprises facilitating connection with the one or more monitoring devices by the mobile device based on the digital barcode.

12. The computer readable storage medium of claim 7, wherein the method further comprises changing the digital barcode as one or more devices are at least one of added and removed from the group of one or more monitoring devices.

13. A device comprising:
    a processor and a memory arranged to store instructions and data and to:
    capture an image of a digital barcode, wherein the digital barcode is a composite barcode indicating a number and a type of connected monitoring devices;
    decode the digital barcode to determine a device identifier for each of one or more monitoring devices represented by the digital barcode, each of the one or more monitoring devices associated with a patient;
    request data from each of the one or more monitoring devices based on the one or more device identifiers; and
    display the requested data.

14. The device of claim 13, wherein the device is to communicate with at least one of a server and directly with the one or more monitoring devices to retrieve the data.

15. The device of claim 13, wherein the device is to connect to at least one of the one or more monitoring devices based on the digital barcode.

16. The device of claim 13, wherein the device comprises at least one of a tablet computer and a smartphone.

17. The device of claim 13, wherein the device is to initiate streaming of content from the one or more monitoring devices based on the one or more device identifiers.

* * * * *